Patented Nov. 25, 1952

2,619,478

UNITED STATES PATENT OFFICE 2,619,478

MOLDING COMPOSITIONS OF VINYL AROMATIC RESINS

Henry W. Wehr, Jr., Midland, and William C. Sager, Jr., Bay City, Mich., assignors to The Dow Chemical Company, Midland, Mich., a corporation of Delaware No Drawing. Application November 14, 1949, Serial No. 127,244

7 Claims. (Cl. 260—33.6)

This invention concerns certain new molding compositions comprising thermoplastic vinyl aromatic resins together with a minor but effective amount of a mineral oil for increasing the rate of flow of the resin during molding and facilitating removal of the molded products from molds in which they are formed.

When vinyl aromatic resins are molded by usual compression, or injection molding methods, several difficulties are encountered in producing accurate moldings at the rapid rates required in commercial operation. For instance, the vinyl aromatic resins, e. g. polystyrene, are often undesirably resistant to rapid flow during molding. The heat-plastified resin frequently fails to flow into all recesses of the mold, or fails to coalesce or weld together in the mold to form a molded product free of weld lines or weakened areas. The molded products frequently stick to the mold in which they are formed with resultant scratching, marring or breaking of the molded articles upon dislodging or ejecting the same from the mold. Such difficulties have been particularly pronounced in producing irregular shaped articles by the injection molding method. Although the rate of flow of a vinyl aromatic resin may readily be increased by incorporating any of a variety of known plasticizing agents with the resin prior to molding, most plasticizers, when added in amount sufficient for the purpose, seriously impair one or more of the properties of the molded product, e. g. by producing a decrease in the tensile strength, a lowering of the heat distortion temperature, or impairing the dielectric properties of the vinyl aromatic resin. It is known that drying oils such as soybean oil, linseed oil, perilla oil, or sardine oil, may be added as flow agents to vinyl aromatic resins, but they tend to discolor the molded articles and, for this reason, frequently are objectionable.

It is an object of the invention to provide certain flow agents which, when incorporated in small amount with a vinyl aromatic resin, not only increase greatly the ease, uniformity and rate of flow of the resin during molding without seriously impairing the properties of the molded product, but also serve as a lubricant for facilitating removal of the molded products from molds in which they are formed. Another object is to provide molding compositions comprised essentially of a vinyl aromatic resin together with a minor amount of a substantially colorless mineral oil, which compositions can be molded rapidly and with accuracy to produce articles having an appearance and mechanical properties practically as good as those of similar articles molded from the vinyl aromatic resin alone. A further object is to provide molding compositions comprising a vinyl aromatic resin and a refined mineral oil consisting principally of saturated aliphatic hydrocarbons, which compositions possess flow characteristics suitable for use in the production of molded products by usual injection molding method, superior to the vinyl aromatic resin alone. Other and related objects will become apparent from the following description of the invention.

According to the invention, the foregoing and related objects can be obtained by incorporating with a vinyl aromatic resin a minor amount, i. e. 4 per cent by weight or less, of a substantially colorless mineral oil consisting principally of saturated aliphatic hydrocarbons having a boiling point between 200° and 600° C., which mineral oil has a viscosity of from 10 to 70 centistokes (from about 60 to about 320 Saybolt seconds) at 100° F. It is important that the mineral oil be used in amount corresponding to from 0.5 to 4 per cent, preferably from 0.5 to 2 per cent, by weight of the vinyl aromatic resin used, in order to obtain a pronounced beneficial effect in increasing the rate of flow of the resin under pressure at a heat-plastifying temperature without appreciable effect on other properties of the resin such as tensile strength, heat distortion temperature, or impact strength. With increase in the proportion of mineral oil above said range of proportions, the oil has an increasing and serious effect on the mechanical properties of the molded articles.

The mineral oils suitable for use as the flow agents in preparing the new compositions are selected from the refined colorless, or substantially colorless, mineral oils consisting principally of saturated aliphatic hydrocarbons. Such mineral oils are known to the trade as "white mineral oil," and are substantially free of unsaturated compounds, or aromatic radicals, e. g. the phenyl or naphthyl radical. They are substantially non-volatile both at room temperature and under usual molding conditions, i. e. they boil at a temperature of 200° C. or higher at 760 millimeters of mercury absolute pressure. Examples of such white mineral oils which are suitable for use as the flow agents are: "Liquid Paraffin Heavy," a colorless mineral oil having a boiling range of approximately 200°–396° C. at atmospheric pressure, a viscosity of 68 centistokes (300–320 Saybolt seconds) at 100° F., a specific gravity of 0.886 at 60° F. compared to water at the same temperature and containing 100 per cent unsulfonated residue; "Fractol A," a colorless mineral oil having a boiling range of about 328°–403° C., a viscosity of 44 centistokes (204.5 Saybolt seconds) at 100° F., a specific gravity of 0.8811 at 60° F. and containing no unsaturation; "White Mineral Oil No. 4695," having a boiling range of about 295°–406° C., a viscosity of 31.5 centistokes (147.5 Saybolt seconds) at 100° F. and containing 100 per cent unsulfonated residue (this oil was obtained from Standard Oil Company of Indiana); "Superla White Oil No. 11,232," having a boiling range of 290°–396° C. and a viscosity of 17.5 centistokes (85–90 Saybolt seconds) at 100° F.; "Superla White Oil No. 9," a nearly colorless mineral oil having a viscosity of 17.2 centistokes (85.8 Saybolt seconds) at 100° F.; and "Eureka White Oil," a colorless mineral oil having a viscosity of 10–11 centistokes at 100° F.

The vinyl aromatic resins to be employed are the solid polymers and copolymers of vinyl aromatic compounds having the vinyl group attached to a carbon atom of the aromatic nucleus. Examples of the thermoplastic vinyl aromatic resins with which the invention is concerned are polystyrene, the solid polymers of para-methylstyrene, meta-ethylstyrene, ortho-chlorostyrene, para-isopropylstyrene, para-chlorostyrene, ortho, para-dimethylstyrene, and solid resinous copolymers of any of the corresponding monovinyl aromatic compounds, or styrene, with other polymerizable unsaturated organic compounds containing an ethylenic group such as vinyl chloride, ethyl acrylate, methyl methacrylate, acrylonitrile, alpha-methylstyrene, alpha-ethylstyrene or para-methyl-alpha-methylstyrene. The invention pertains especially to molding compositions comprising polystyrene as the vinyl aromatic resin component.

The mineral oil may be incorporated with the vinyl aromatic resin by mixing together the heat-plastified resin and the oil by a rolling, extruding, or milling operation such as by milling a mixture of the resin and the oil on heated compounding rolls until a homogeneous composition is obtained. However, the mineral oil is most conveniently added to the polymerizable compound or compounds used in making the vinyl aromatic resin prior to polymerizing such compounds to form the resin. The polymerization is preferably carried out in bulk, i. e. in the substantial absence of inert liquid media, and at temperatures in the order of from 50° to 200° C. A small amount, e. g. from 0.01 to 2 per cent by weight, of a polymerization catalyst such as benzoyl peroxide, lauryl peroxide, or di-tertiary-butyl peroxide, may advantageously be included in the mixture, although such catalyst is not essential. The mineral oil added as flow agent has little, or no, effect on the rate or extent of polymerization. It does tend to render the polymer product of more uniform viscosity throughout the mass than when the polymerization is carried out in the absence of the mineral oil under otherwise similar conditions. By adding the mineral oil to the polymerizable material prior to forming the resin, the mineral oil becomes uniformly incorporated throughout the mass of resin. In this connection it may be mentioned that the molding compositions prepared by adding the mineral oil to the polymerizable starting materials have somewhat better flow characteristics during molding than similar compositions prepared by admixing the oil directly with the preformed vinyl aromatic resin.

The molding composition is usually produced in a granular form such as is conveniently used in molding operations. The new compositions are adapted for use in any of the conventional molding or extrusion operations and may be used with particular advantage in injection molding processes.

The following examples describe a number of ways in which the principle of the invention has been applied, but are not to be construed as limiting the invention.

EXAMPLE 1

In each of a series of experiments, styrene along or a mixture of styrene and white mineral oil having the viscosity indicated in the following table and consisting principally of saturated aliphatic hydrocarbons, was polymerized in the presence of 0.03 per cent by weight of benzoyl peroxide by heating the same in a closed container in accordance with the following schedule of time and temperature conditions: 48 hours at 83° C.; 8 hours at 85° C.; and 48 hours at 200° C. The rate of flow at 135° C. in terms of seconds required for a sample of the material to flow 1½ inches through a ⅛ inch orifice under an applied pressure of 1000 pounds per square inch was determined in accordance with procedure described in A. S. T. M. D569—44T. The time required for this amount of flow becomes less with increase in rate of flow. A portion of each product was injection molded to form test bars ¼ by ¼ inch square cross section. These test bars were used to determine the tensile strength in pounds per square inch of original cross section, the per cent of its original length by which each product could be elongated under tension before breakage occurred and the impact strength of each product in foot-pounds of energy applied as a sharp blow to cause breakage of a test bar. Except for the shape and dimensions of the test bars and the weight of the hammer used in measuring impact strength, the procedures used in determining the tensile strength and per cent elongation values were similar to those described in A. S. T. M. D638—44T and was procedure followed in measuring impact strength was similar to that described in A. S. T. M. D256—43T. Other molded test pieces of each product were used to determine heat distortion temperatures by a procedure of Heirholzer and Boyer, A. S. T. M. Bulletin No. 134 of May 1945. Portions of each polymeric product were tested to determine the proportion of volatile material therein and also to determine a viscosity characteristic of the polymer. The procedure in determining the proportion of volatile material was to weigh a portion of the powdered polymeric product, then heat it at 213° C. and 1 millimeter absolute pressure for 25 minutes, then cool and re-weigh. The loss in weight represents volatile ingredients. The viscosity characteristic was determined by dissolving a portion of polymeric product in toluene to form a solution containing 10 per cent by weight of said product and determining the absolute viscosity in centipoises at 25° C. of the solution. Table I identifies each polymeric product by naming the ingredients of the polymerization mixture from which it was prepared and giving the per cent by weight of each ingredient in the mixture. It also gives the properties determined for each product.

Table I

| No. | Percent styrene | White mineral oil Name | White mineral oil Viscosity, cks. 100° F. | White mineral oil Percent | Flow rate, seconds | Tensile strength, lbs./sq.in. | Impact strength, foot-lbs. | Percent elongation | Percent volatiles | Viscosity, cps. | Heat distortion temperature, °C. |
|---|---|---|---|---|---|---|---|---|---|---|---|
| 1 | 100 | | | | 136 | 5,430 | 0.076 | 1.9 | 0.73 | 39 | 81 |
| 2 | 99 | Liquid Paraffin Heavy | 68 | 1 | 101 | 5,770 | .132 | 2.2 | 1.66 | 53.4 | 80 |
| 3 | 98 | ...do... | | 2 | 87 | 5,670 | .114 | 2.2 | 1.96 | 41.2 | 80 |
| 4 | 99 | No. 4,695 | 31.5 | 1 | 110 | 6,275 | .169 | 2.4 | 1.42 | 40.3 | 82 |
| 5 | 98 | ...do... | | 2 | 60 | 5,720 | .108 | 2.3 | 1.87 | 40.3 | 85 |
| 6 | 99 | Superla No. 9 | 18.5 | 1 | 111 | 6,040 | .098 | 2.0 | 1.28 | 42 | 84 |
| 7 | 98 | ...do... | | 2 | 88 | 6,040 | .102 | 2.2 | 2.31 | 51 | 72 |
| 8 | 99 | Superla No. 11,232 | 19 | 1 | 120 | 6,700 | .102 | 2.3 | 1.68 | 52.5 | 83 |
| 9 | 98 | Eureka White Oil | 10-11 | 2 | 73 | 5,950 | .079 | 2.1 | 2.92 | 46.0 | 79 |

EXAMPLE 2

In each of a series of experiments, mixtures of styrene with different amounts of Fractol A, a colorless mineral oil having a viscosity of 44 centistokes (204.5 Saybolt seconds) at 100° F., a specific gravity of 0.8811 at 60° F. compared to water at the same temperature and consisting of saturated aliphatic hydrocarbons containing 100 per cent unsulfonated residue, i. e. free of olefinic linkages or aromatic radicals, were polymerized in the presence of 0.03 per cent by weight of benzoyl peroxide by sealing the mixtures in closed containers and heating the same in accordance with the following schedule of time and temperature conditions: 48 hours at 80° C.; 8 hours at 95° C.; and 48 hours at 200° C. The properties of the polymeric products were determined as in Example 1. Table II identifies the polymeric product by giving the per cent by weight of the styrene and the mineral oil used in preparing the same. It also gives the properties determined for each product.

Table II

| No. | Polymerization mixture Percent styrene | Polymerization mixture Percent mineral oil | Flow rate, seconds | Tensile strength, lbs./sq.in. | Impact strength, foot-lbs. | Percent elongation | Percent volatiles | Viscosity, cps. | Heat distortion temp., °C. |
|---|---|---|---|---|---|---|---|---|---|
| 1 | 99.5 | 0.5 | 155 | 6,675 | 0.125 | 2.9 | 1.10 | 58.3 | 82 |
| 2 | 99 | 1.0 | 136 | 6,550 | .123 | 2.8 | 1.10 | 54.5 | 80 |
| 3 | 98.5 | 1.5 | 123 | 6,310 | .126 | 2.6 | 1.27 | 58.2 | 78 |
| 4 | 98 | 2.0 | 100 | 6,300 | .063 | 2.2 | 2.00 | 54 | 77 |

EXAMPLE 3

Styrene alone and mixtures of styrene and a colorless mineral oil having a boiling range of approximately 295°–406° C., a viscosity of 31.5 centistokes (147.5 Saybolt seconds) at 100° F. and consisting of saturated aliphatic hydrocarbons, i. e. having 100 per cent unsulfonated residue in accordance with procedure described in A. S. T. M. D483—40, were in a series of experiments, polymerized by heating the starting materials to a temperature of 126°–127° C., over a period of 64 hours. The rate of flow and impact strength of the polymeric products were determined as in Example 1. Table III identifies the polymeric product by giving the per cent by weight of styrene and mineral oil used in preparing the same. It also gives the properties determined for each product.

Table III

| No. | Polymerization mixture Percent styrene | Polymerization mixture Percent mineral oil | Flow rate, seconds | Impact strength, foot-lbs. |
|---|---|---|---|---|
| 1 | 100 | 0 | 87 | 0.10 |
| 2 | 99 | 1 | 52 | .09 |
| 3 | 98 | 2 | 57 | .18 |
| 4 | 97 | 3 | 48 | .10 |
| 5 | 96 | 4 | 32 | .10 |

It will be noted that the incorporation of from 1 to 4 percent of the mineral oil together with the polystyrene, increased tremendously the rate of flow at a heat-plastifying temperature, but that it did not seriously impair the impact strength of the molded tests bars. In general, the products are impaired to a serious extent by the use of more than 4 per cent of a white mineral oil together with a vinyl aromatic resin, but lesser amounts of such oil may be used to improve the flow rates of the resins without impairing to any great extent the properties of the articles molded therefrom.

In the following claims the term "polymer" is intended to include the homopolymers and copolymers of the compounds named.

Other modes of applying the principle of the invention may be employed instead of those explained, change being made as regards the method or compositions herein disclosed, provided the steps or ingredients stated by any of the following claims or the equivalent of such steps or ingredients be employed.

We claim:

1. A molding composition comprised essentially of a solid thermoplastic vinyl aromatic resin which is a polymer of a compound of the class consisting of monovinyl aromatic hydrocarbons of the benzene series and nuclear chlorinated monovinyl aromatic hydrocarbons of the benzene series uniformly incorporated with from 0.5 to 4 per cent by weight of a white mineral oil having a boiling range between 200° and 600° C. and consisting principally of saturated aliphatic hydrocarbons, said mineral oil having a viscosity between 10 and 70 centistokes at 100° F. and being substantially free of olefinic linkages.

2. A molding composition comprised essentially of a solid thermoplastic vinyl aromatic resin which is a polymer of a compound of the class consisting of monovinyl aromatic hydrocarbons of the benzene series and nuclear chlorinated monovinyl aromatic hydrocarbons of the benzene series uniformly incorporated with from 0.5 to 2 per cent by weight of a white mineral oil having a boiling range between 200° and 600° C. and consisting principally of saturated aliphatic hydrocarbons, said mineral oil having a viscosity between 10 and 70 centistokes at 100° F. and being substantially free of olefinic linkages.

3. A molding composition comprised essentially of a solid thermoplastic vinyl aromatic resin which is a polymer of a compound of the class consisting of monovinyl aromatic hydrocarbons of the benzene series and nuclear chlorinated monovinyl aromatic hydrocarbons of the benzene series uniformly incorporated with from 0.5 to 2 per cent by weight of a colorless mineral oil having a boiling range between 200° and 600° C. and consisting of saturated aliphatic hydrocarbons, said mineral oil having a viscosity between 10 and 70 centistokes at 100° F. and containing 100 per cent unsulfonated residue.

4. A molding composition comprised essentially of solid polystyrene having uniformly incorporated therewith from 0.5 to 4 per cent by weight of a white mineral oil having a boiling range between 200° and 600° C. and consisting principally of saturated aliphatic hydrocarbons, said mineral oil having a viscosity between 10 and 70 centistokes at 100° F. and being substantially free of olefinic linkages.

5. A molding composition comprised essentially of solid polystyrene having uniformly incorporated therewith from 0.5 to 2 per cent by weight of a white mineral oil having a boiling range between 200° and 600° C. and consisting principally of saturated aliphatic hydrocarbons, said mineral oil having a viscosity between 10 and 70 centistokes at 100° F. and being substantially free of olefinic linkages.

6. A molding composition comprised essentially of solid polystyrene having uniformly incorporated therewith from 0.5 to 2 per cent by weight of a colorless mineral oil having a boiling range between 200° and 600° C. and consisting of saturated aliphatic hydrocarbons, said mineral oil having a viscosity between 10 and 70 centistokes at 100° F. and containing 100 per cent unsulfonated residue.

7. A method of making a molding composition which comprises, uniformly incorporating from 0.5 to 4 per cent by weight of a white mineral oil having a boiling range between 200° and 600° C. and consisting principally of saturated aliphatic hydrocarbons, with monomeric styrene by dissolving the mineral oil in the styrene, and thereafter polymerizing the styrene by heating the solution in mass, said mineral oil having a viscosity between 10 and 70 centistokes at 100° F. and being substantially free of olefinic linkages.

HENRY W. WEHR, JR.
WILLIAM C. SAGER, JR.

REFERENCES CITED

The following references are of record in the file of this patent:

UNITED STATES PATENTS

| Number | Name | Date |
|---|---|---|
| 2,078,422 | Smith | Apr. 27, 1937 |
| 2,455,890 | Fawcett et al. | Dec. 7, 1948 |
| 2,529,261 | Powers | Nov. 7, 1950 |